United States Patent
Shibasaki et al.

(10) Patent No.: US 6,724,731 B1
(45) Date of Patent: Apr. 20, 2004

(54) RADIO COMMUNICATION SYSTEM AND CONTROL METHOD, AND INFORMATION PROCESSING APPARATUS USED THEREIN

(75) Inventors: Tomoki Shibasaki, Kawasaki (JP); Yasunao Mizutani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/093,734

(22) Filed: Jun. 9, 1998

(30) Foreign Application Priority Data

Nov. 4, 1997 (JP) .............................. 9-302141

(51) Int. Cl.[7] .............................................. G01R 31/08
(52) U.S. Cl. ..................... 370/251; 370/242; 370/248
(58) Field of Search ................................ 370/328, 241, 370/242, 247, 248, 251, 253, 338, 340, 216, 217, 219, 220, 221, 223, 224, 225, 228, 244, 250, 353, 354, 356, 400, 401, 437; 455/67.6, 67.3, 67.4; 714/712, 713, 715

(56) References Cited

U.S. PATENT DOCUMENTS

| | | | | |
|---|---|---|---|---|
| 5,134,643 A | * | 7/1992 | Iwata | 455/423 |
| 5,159,596 A | * | 10/1992 | Itoh | 370/329 |
| 5,361,402 A | * | 11/1994 | Grube et al. | 455/67.1 |
| 5,390,199 A | * | 2/1995 | Ajima et al. | 455/819 |
| 5,410,753 A | * | 4/1995 | Szabo | 379/67.4 |
| 5,425,076 A | * | 6/1995 | Knippelmier | 455/27 |
| 5,546,382 A | * | 8/1996 | Fujino | 455/405 |
| 5,570,373 A | * | 10/1996 | Wing | 455/423 |
| 5,649,290 A | * | 7/1997 | Wang | 370/232 |
| 5,697,064 A | * | 12/1997 | Okamoto et al. | 455/507 |
| 5,699,367 A | * | 12/1997 | Haartsen | 714/749 |
| 5,754,560 A | * | 5/1998 | Nousianinen et al. | 714/716 |
| 5,793,866 A | * | 8/1998 | Brown et al. | 380/2 |
| 5,838,770 A | * | 11/1998 | Fukushima et al. | 379/34 |
| 5,907,676 A | * | 5/1999 | Fujishiro et al. | 709/203 |
| 5,943,617 A | * | 8/1999 | Nakamura | 455/423 |
| 6,148,010 A | * | 11/2000 | Sutton et al. | 370/536 |
| 6,421,714 B1 | * | 7/2002 | Rai et al. | 709/217 |

FOREIGN PATENT DOCUMENTS

| | | |
|---|---|---|
| JP | 3-27630 | 2/1991 |
| JP | 6-45991 | 2/1994 |
| JP | 9-93370 | 4/1997 |

* cited by examiner

*Primary Examiner*—Phirin Sam
(74) *Attorney, Agent, or Firm*—Arent Fox Kintner Plotkin & Kahn, PLLC

(57) ABSTRACT

A radio communication system control method, a radio communication system, and an information processing apparatus used therein is one where system a server and terminals are linked via a plurality of base stations. The radio communication system is configured to prevent communication errors. When the link between a server and a base station is disconnected, the server detects the disconnection, and transmits, to a base station adjacent to the base station, a power supply off command for disconnecting the power supply in the base station. By transmitting the command to the base station via the base station, the server disconnects the power supply in the base station and stops the communication between the base station and a radio terminal apparatus.

21 Claims, 7 Drawing Sheets

| BASE STATION ID | LINK CONDITION |
|---|---|
| ID-1 | NG |
| ID-2 | OK |
| ⋮ | ⋮ |
| ID-M | OK |

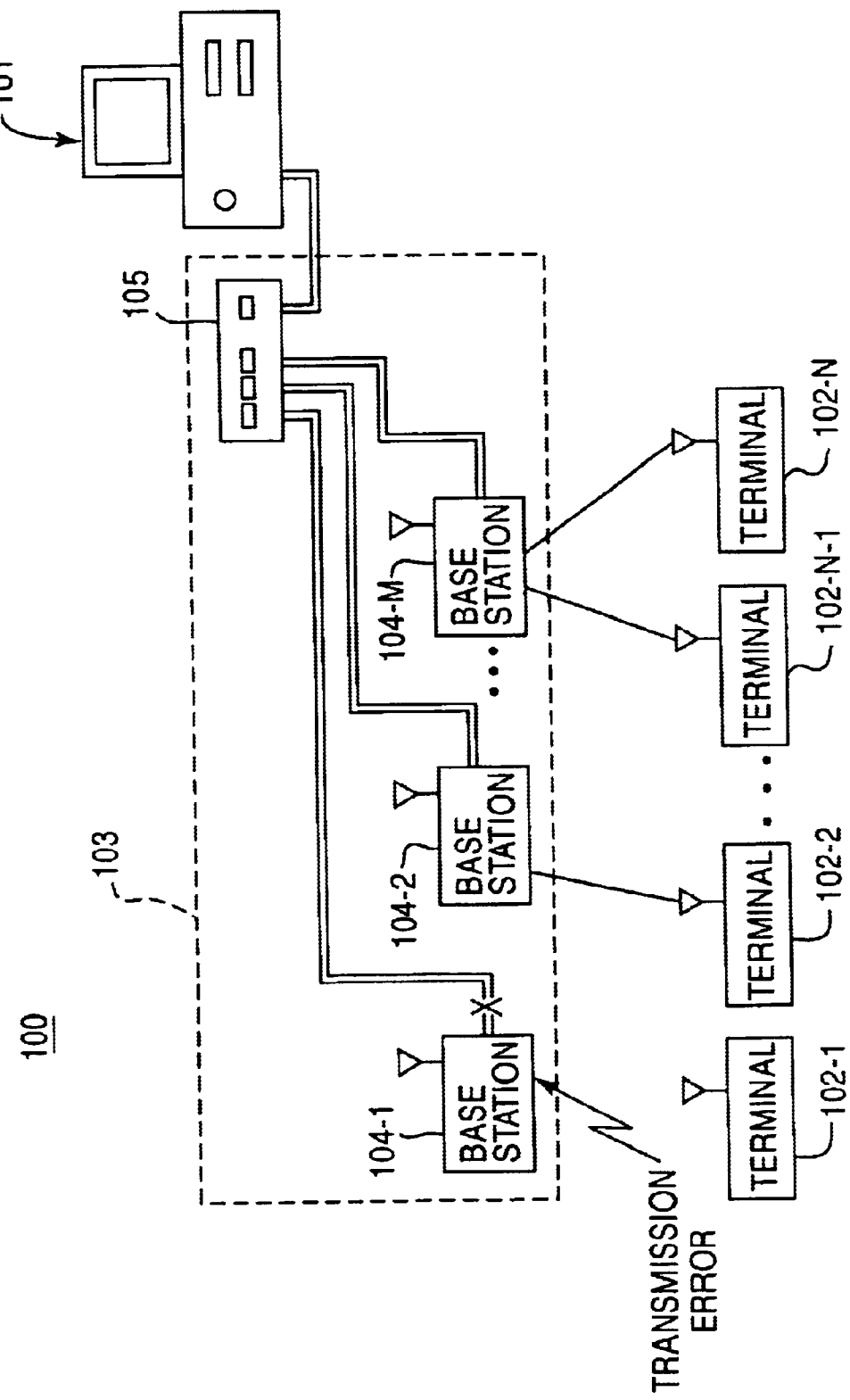

RADIO COMMUNICATION SYSTEM AND CONTROL METHOD, AND INFORMATION PROCESSING APPARATUS USED THEREIN

BACKGROUND OF THE INVENTION

1. Field of the Invention

The present invention relates to a radio communication system control method, a radio communication system, and an information processing apparatus used therein. More particularly, the invention is directed to a system and method wherein radio communications links a server and terminals via a plurality of base stations.

In a conventional radio or wireless LAN system, the radio terminal apparatus assumes that an appropriate link or connection exists between a base station and a server (parent machine and child machine), even in situations where there is no proper link between the base station and the server. Transmission of data, therefore, beginning based upon this erroneous presumption. Communication errors therefore occur; due to the fact that the radio terminal apparatus cannot recognize or identify the source of the communication error, the error is repeated.

2. Description of the Related Art

FIG. 8 shows a block diagram of one example of a radio LAN system in the prior art.

A communication system 100 in the prior art includes a server 101, radio terminal apparatus 102-1 through 102-N which communicate with the server through radio communication, and a communication apparatus 103. The communication apparatus 103 connects the server 101 with the radio terminal apparatuses 102-1 through 102-N through radio communication and forms radio LAN circuits.

The server 101 is connected with the radio terminal apparatuses 102-1 through 102-N via the communication apparatus 103, and performs predetermined processing in accordance with commands from the radio terminal apparatuses 102-1 through 102-N. The radio terminal apparatuses 102-1 through 102-N perform radio communication with the communication apparatus 103 and are connected with the server 101.

The communication apparatus 103 includes a plurality of base stations 104-1 through 104-M which perform radio communication with the radio terminal apparatuses 102-1 through 102-N, and a branching device (HUB) 105 which causes a communication circuit from the server 101 to branch to the plurality of base stations 104-1 through 104-M.

In the radio LAN system 100 in the prior art, for example, when the link of the base station 104-1 with the server 101 is disconnected for any reason as indicated by X in FIG. 8, the radio terminal apparatus 102-1 existing in the communication possible area of the base station 104-1 is completely independent and is not aware of the condition of link, the radio terminal apparatus 102-1 operates as if the link is normal and starts communication.

As a result, however, communication errors occur in radio terminal apparatus 102-1. However, radio terminal apparatus 102-1 does not recognize the cause of the communication errors; radio terminal apparatus 102-1 therefore continues the communication with base station 104, and the communication errors repetitively occur.

In the communication system discussed above, when the link between the server and a base station is disconnected, the radio terminal apparatus performs communication with the base station continuously even though the link between this base station and the server is disconnected. This occurs because the radio terminal apparatus is not aware of the condition of the link between the server and the base station. Communication errors therefore frequently and repetitively occur. Further, because the radio terminal apparatus cannot recognize the cause of the communication error, restoration cannot be performed easily.

When the number of base stations (parent machines) increases, there are additional problems; when malfunctions occur, for example, a great deal of labor and time are required for identifying and correcting the cause of the malfunction, and also restoring the errors caused by the malfunction.

The present invention has been developed in consideration of the above-mentioned problems. An object of the present invention is to provide a radio communication system control method, a radio communication system control method, a radio communication system, and an information processing apparatus used therein, wherein communication impossible conditions or communication breakdowns can be prevented from occurring in the radio communication system, therefore reducing communication errors.

SUMMARY OF THE INVENTION

The present invention is directed to a radio communication system in which a server and terminals communicate via a plurality of base stations, comprising a method which includes a link detecting step detecting conditions of links between the server and the plurality of base stations, and a communication stopping step stopping the communication between a base station and a terminal, disconnection of the link between the base station and the server having been determined as a result of detection in the link detecting step.

According to a first embodiment the present invention, as a result of the communication between the disconnected base station and the terminal being stopped in the stopping step, the terminal does not perform communication with the base station and thereby communication errors in the terminal can be avoided.

In a second embodiment of the invention, the communication stopping step stops the communication between the disconnected base station and the terminal by disconnecting a power supply in the base station through a command radio-transmitted from an adjacent base station.

According to this second embodiment, as a result of the disconnection of the power supply in the base station, through the command from the adjacent base station, the communication between the terminal and this base station is stopped.

In a third embodiment, the invention further comprises a communication switching step enabling communication between the server and the terminal through the base station adjacent to the disconnected base station, after the communication between the terminal and the disconnected base station is stopped.

According to the third embodiment, because the terminal which is intended to perform communication with the disconnected base station can perform communication with the adjacent base station, communication errors in the terminal can be avoided.

A fourth embodiment of the invention is one where the link detecting step repeatedly detects the links between the server and the plurality of base stations every predetermined time period. According to this embodiment, as a result of detection of the links between the server and the plurality of base stations every predetermined time period, any disconnection or failed link can be detected very quickly, communication from the terminal can be stopped, and communication error in the terminal can be avoided.

In a fifth embodiment, in a radio communication system according to the invention comprises a system including link detecting means for detecting conditions of links between the server and the plurality of base stations, and first communication stopping means, provided in the server, for stopping communication between a base station and a terminal, disconnection of the link between the base station and the server having been determined as a result of detection by the link detecting means. The stopping of the communication is performed by an adjacent base station.

According to this embodiment, the link detecting means detects the disconnected base station, and the communication stopping means stops the communication between the terminal and this disconnected base station. Because the terminal does not perform communication with the disconnected base station, communication errors in the terminal can be avoided.

According to a sixth embodiment, the server has a link condition management table for managing the conditions of the links between the server and the plurality of base stations. As a result of management of the conditions of the links of the plurality of base stations through the link condition management table, the overall condition of the system can be reliably determined, and the reliability of the system can be improved.

In a seventh embodiment, the communication stopping means provides a command for disconnecting the power supply in the disconnected base station. As a result, the power supply in the base station is disconnected through the other base station, and the communication between the terminal and the base station can be stopped.

In yet another embodiment of the invention, an eighth embodiment, the plurality of base stations have second communication stopping means for stopping the communication with the terminals when receiving the command. As a result of the plurality of base stations having the second communication stopping means for stopping the communication with the terminal when receiving the command, the communication between the terminal and the base station can be stopped in accordance with the command from the other base station.

A ninth embodiment of the invention is one where the second communication stopping means of the eighth embodiment has a power supply controlling means for disconnecting a power supply for driving the base station when receiving the command from another base station. As a result, the power supply in the disconnected base station is disconnected in accordance with the command from the other base station, and the disconnected base station becomes inoperable. The communication between the disconnected base station and the terminal can be stopped.

In a tenth embodiment, the link detecting means detects the conditions of the links between the server and the plurality of base stations every predetermined time period. As a result, the disconnected base station can be immediately detected, communication can be stopped, and communication errors can be avoided.

An eleventh embodiment of the invention is one where an information processing apparatus is connected with a plurality of radio communication stations, and comprises connection condition detecting means for detecting conditions of connections with the radio communication station, and command sending means for sending a command for stopping operation of a first radio communication station of the plurality of radio communication stations, to a second radio communication station of the plurality of radio communication stations, when it is detected that the first radio communication station is not connected with the information processing apparatus as a result of detection performed by the connection condition detecting means. As a result, it is possible to stop the operation of the first radio communication station through the command. Communication from the terminal to the first radio communication station can therefore be stopped, and communication errors in the terminal can be avoided.

In a twelfth embodiment, an information processing apparatus is connected with a higher-rank or higher priority apparatus, and performs processing in accordance with a command from the higher-rank apparatus, and also performs radio communication with a device. The embodiment includes command receiving means for receiving a command for the device provided by the higher-rank apparatus, the command instructing disconnection of a power supply of a disconnected or malfunctioning apparatus. Power supply disconnection apparatus recognizing means are provided for recognizing, based on the command, the particular apparatus in which the power supply is to be disconnected.

The information processing apparatus provides a command to the device, instructing disconnection of the power supply, the power supply being to be disconnected in the other apparatus and the other apparatus having been recognized by the power supply disconnection apparatus recognizing means.

By receiving the disconnecting command provided by the higher-rank apparatus, the power supply in the malfunctioning apparatus is disconnected and the communication between the malfunctioning apparatus and the terminal can be stopped.

BRIEF DESCRIPTION OF THE DRAWINGS

FIG. 3 shows a data arrangement of a link condition management table in the embodiment of the present invention;

FIG. 8 shows a general block diagram of one example of a communication system in the prior art.

DETAILED DESCRIPTION OF THE PREFERRED EMBODIMENTS

Figure 1:
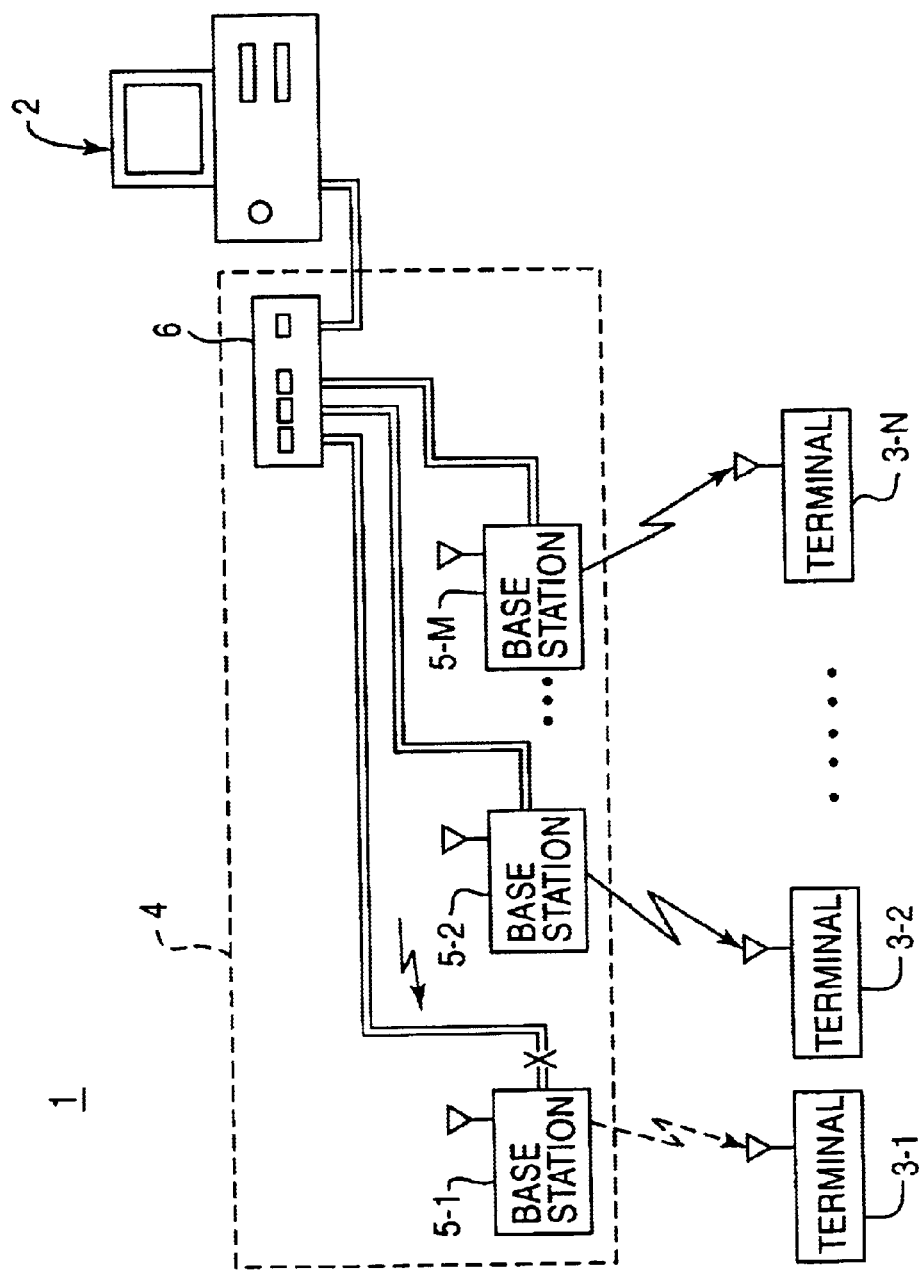
FIG. 1 shows a general block diagram of one embodiment of the present invention.

FIG. 1 shows a general block diagram of one embodiment of the present invention.

A communication system 1 forms a radio LAN system. The communication system 1 includes a server 2, radio terminal apparatuses 3-1 through 3-N connected to the server through radio communication, and a communication apparatus 4 which enables the server 2 to communicate with the radio terminal apparatuses 3-1 through 3-N through wireless radio communication. The communication apparatus 4, server 2, and terminals form radio LAN circuits.

Server 2 is connected with communication apparatus 4 through a communication circuit. Communication apparatus 4 communicates with radio terminal apparatuses 3-1 through 3-N through radio communication. Server 2 receives commands from radio terminal apparatuses 3-1 through 3-N through communication apparatus 4 and performs predetermined processing in accordance with the commands.

The communication apparatus 4 includes a plurality of base stations 5-1 through 5-M which perform radio communication with radio terminal apparatuses 3-1 through 3-N, and a branching device (HUB) 6 which enables the communication circuit from server 2 to branch to the plurality of base stations 5-1 through 5-M. The radio communication possible areas of base stations 5-1 through 5-M are set so that the radio communication possible areas of adjacent ones of the base stations overlap each other. Thus, the base stations are disposed so that, when one of the base stations are disposed so that, when one of the base stations has a malfunction, the terminal can perform communication through an adjacent one of the base stations. There are various ways to overlap the communication possible areas of the base stations. The overlap configurations for the communication possible areas of the base stations is not limited to the manner in which the radio communication possible areas of adjacent ones of the base stations overlap each other.

Figure 2:
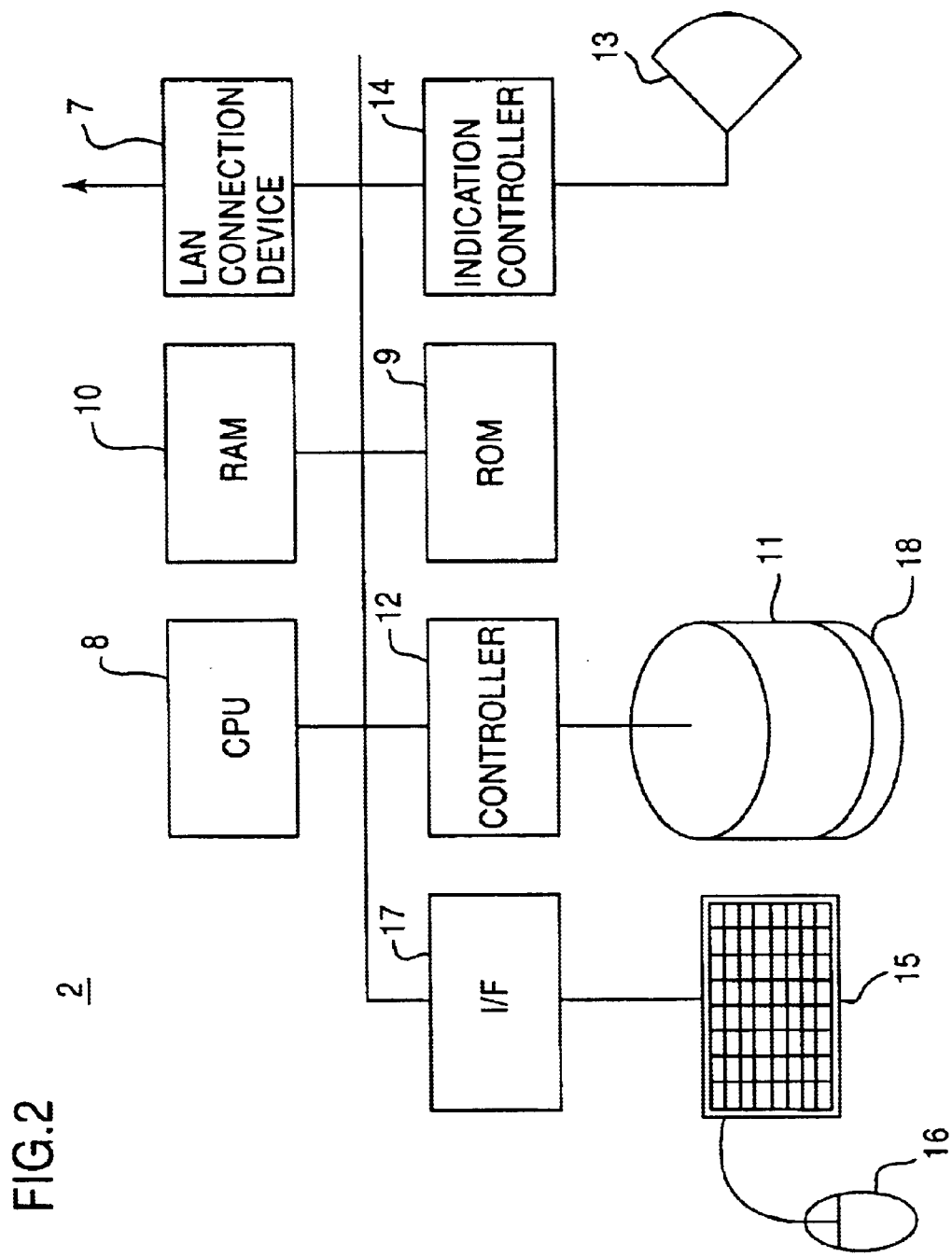
FIG. 2 shows a block diagram of a server in the embodiment of the present invention.

An arrangement of server 2 will now be described with reference to FIG. 2.

Server 2 includes LAN connection device 7 which provides a connection with communication apparatus 4, CPU 8 which performed predetermined processing in accordance with commands supplied from radio terminal apparatuses 3-1 through 3-N through LAN connection device 7, ROM 9 which stores an operating system (OS) for starting server 2 and for performing similar functions, RAM 10 which serves as a work area used when CPU 8 performs processing, file device 11 which stores information to be transmitted to radio terminal apparatuses 3-1 through 3-N in response to requests from radio terminal apparatuses 3-1 through 3-N, controller 12 which controls file device 11, display 13 which indicates results of processing and other data, indication controller 14 which controls the output of display 13, keyboard 15, and mouse 16 which are used for setting processing and performing various input functions. Interface 17 is provided for connection of keyboard 15 and mouse 16.

In file device 11, a link condition management table 18 is provided for managing the conditions of the base stations 5-1 through 5-M. In link condition management table 18, a flag is set for each of the base stations 5-1 through 5-M for determining whether or not the base stations 5-1 through 5-M can be connected to the server 2.

FIG. 3 shows a data arrangement of the link condition management table of the server in the embodiment of the present invention.

In link condition management table 18, a flag is set for each base station ID which is used for identifying a respective one of the base stations 5-1 through 5-M. For example, when disconnection of the link between the base station 5-1 and server 2 is detected, the link condition flag of the base station ID 'ID-1' corresponding to the base station 5-1 is caused to be 'NG'. With regard to the other base stations, when server 2 is connected with these base stations, 'OK' indicating the connection condition is set in the link condition flags. By referring to the link condition management table 18, the connection conditions of the base stations 5-1 through 5-M can be identified.

Figure 4:
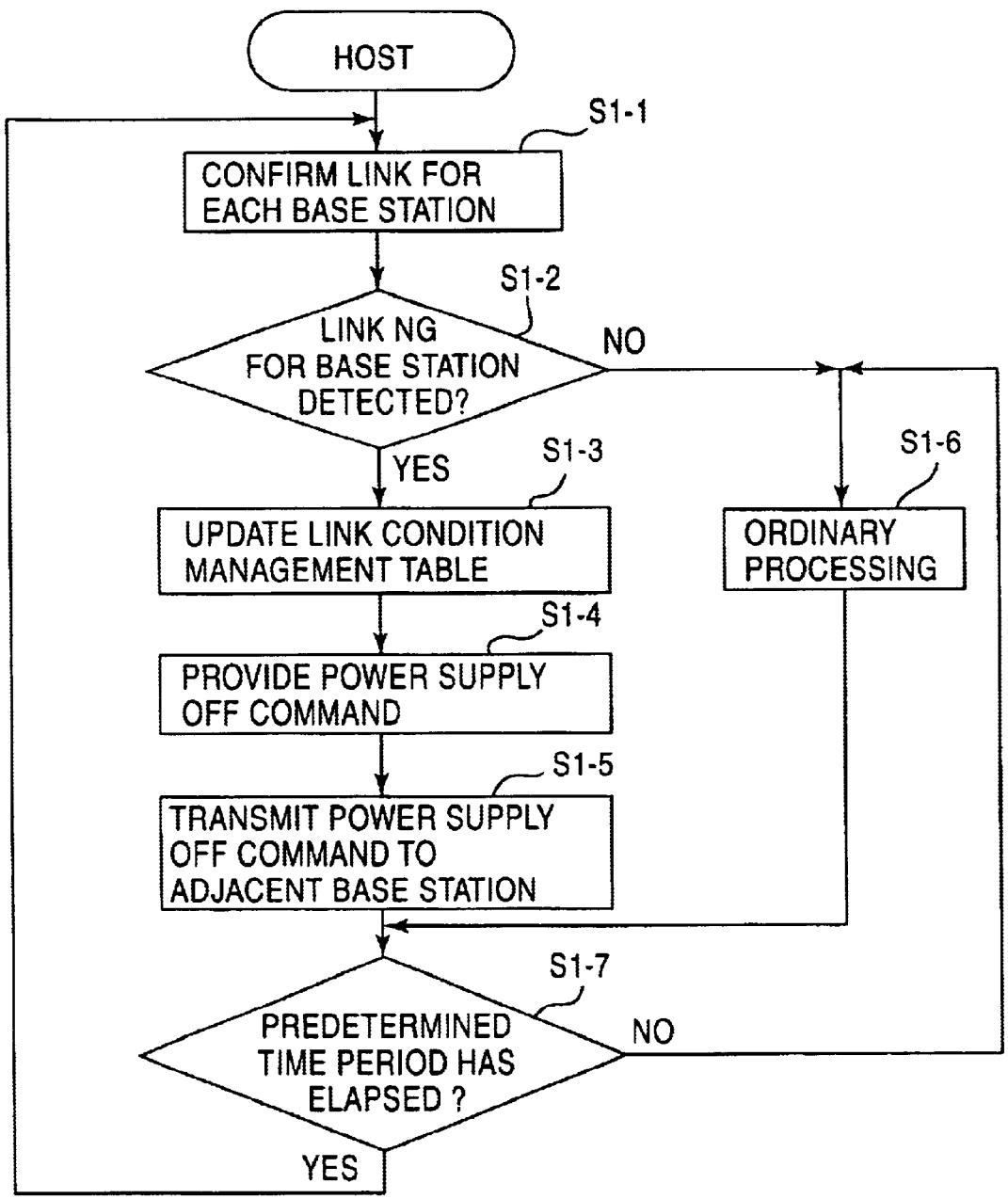
FIG. 4 shows a flowchart of processing performed by the server in the embodiment of the present invention.

FIG. 4 shows a flowchart of the process performed by the server in the embodiment of the present invention. In server 2, the conditions of the links with base stations 5-1 through 5-M are detected every predetermined time period (in a step S1-1).

A method for detecting the conditions of the links for the base stations 5-1 through 5-M by server 2 in step S1-1 is such that server 2 transmits an existing response confirmation command to the respective base stations 5-1 through 5-M, then, the links for the base stations which respond to the command are determined to be in the normal condition. The links for the base stations which do not respond to the command are determined to be disconnected. For the existing response confirmation command, for example, a command in PING (Packet Internet Groper) or TCP/IP (Transmission Control Protocol/Internet Protocol), or another suitable command, is assigned.

When base station 5-1 of the base stations 5-1 through 5-M has a link NG as a result of the detection in step S1-1, that is, base station 5-1 does not respond to the request from server 2, the link condition management table 18 is updated and the link condition flag for the base station ID 'ID-1' corresponding to base station 5-1 is set to 'NG'. With regard to the other base station, when these base stations respond to the request from server 2, server 2 sets the link condition flags for the base station IDs 'ID-2' through 'ID-M', corresponding to these base stations 5-2 through 5-M, to 'OK' (in steps S1-2, S1-3).

After the updating of the link condition management table 18 in step S1-3, a power supply off command for disconnecting the power supply in the base station 5-1 is provided in order to stop the communication between the base station 5-1, which is not linked with server 2, and the radio terminal apparatuses 3-1 through 3-N (in step S1-4).

When the power supply off command is provided in step S1-4, then, this power supply off command is supplied to base station 5-2 (in S1-5), Base station 5-2 is adjacent to the base station 5-1, the communication possible areas of these base stations 5-1 and 5-2 overlap one another, and the link condition flag for the base station 5-2 is 'OK'. Server 2 holds information, as to which ones of the base stations can perform communication with each other, in a form of a table or other suitable system for holding information. Then, when one of the base stations is determined to have the link NG, the base station which can perform communication with the malfunctioning base is selected as a result of the information in the table.

When it is detected that the base station does not have the link NG in step S1-2, setting of the flag in the link condition management table 18 to 'NG' is not performed, and server 2 performs ordinary processing (in step S1-6).

Server 2 performs the above-mentioned steps S1-1 through S1-6 repeatedly after the lapse of a predetermined time period.

The power supply off command transmitted from server 2 is supplied to base station 5-2 and is supplied to base station 5-1 from base station 5-2. For the power supply off command, similarly to the case of the response confirmation command, an appropriate command in, for example, PING or TCP/IP is assigned.

Figure 5:
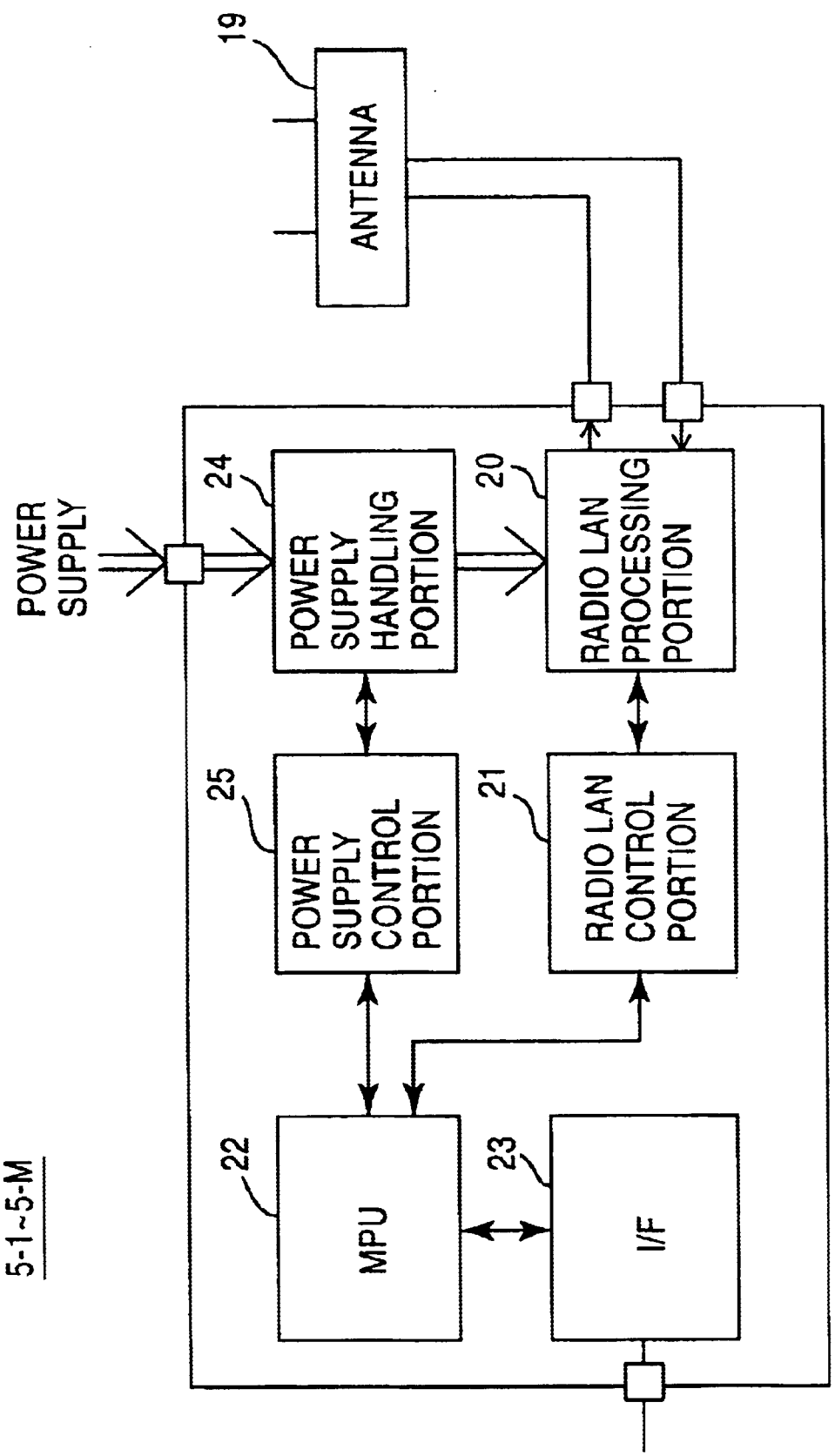
FIG. 5 shows a block diagram of a base station in the embodiment of the present invention.

FIG. 5 shows a block diagram of a base station in one embodiment of the present invention. The base station includes antenna 19 for performing transmission and reception of radio waves with radio terminal apparatuses 3-1 through 3-N, radio LAN processing portion 20 which processes signals to be transmitted and received through antenna 19, radio LAN control portion 21 which controls signals input to and output from the radio LAN processing portion 20, MPU 22 which performs processing in accordance with commands from server 2, interface portion 23 which acts as an interface with the server 2, a power supply handling portion 24 which controls supply and disconnection of power to the base station, and a power supply control portion 25 which controls the power supply handling portion 24 in accordance with a command from the MPU 22.

When recognizing the power supply off command from the other base station through radio communication, the MPU 22 controls the power supply control portion 25 in accordance with the power supply off command, thus driving the power supply handling portion 24, which supplies and/or disconnects the driving power to the internal circuits.

Figure 6:
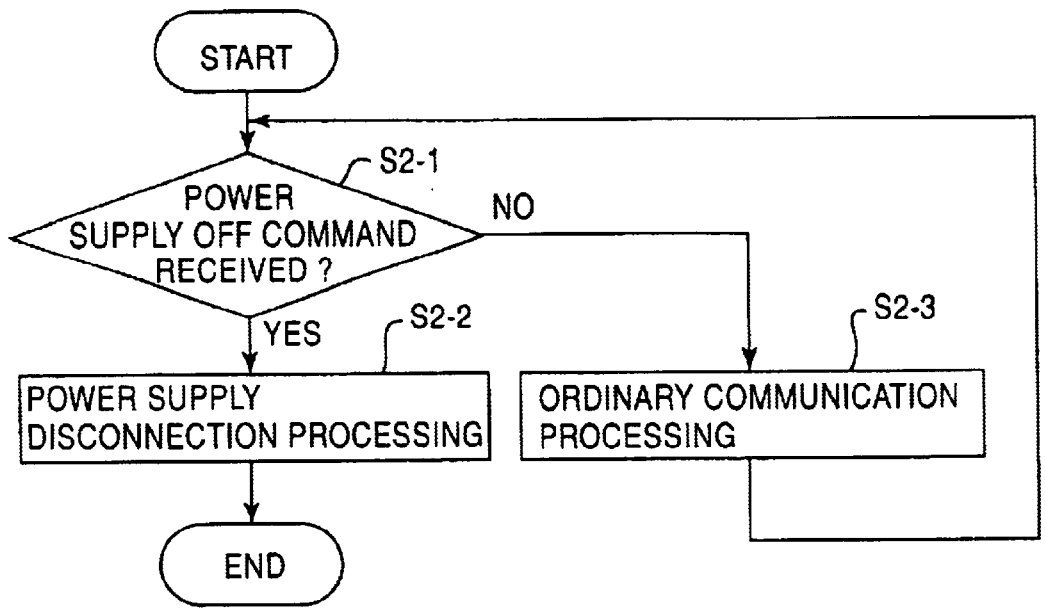
FIG. 6 shows a flowchart of processing performed by the base station in the embodiment of the present invention.

FIG. 6 is a flowchart, illustrating the steps performed by a base station according to the present invention.

In base stations 5-1 through 5-M, when the power supply off command is supplied via branching device 6 from server 2, the power supply off command is supplied to MPU 22 via Interface portion 23. MPU 22 recognizes the power supply off command and sends the power supply off command, through radio communication, to the base station in which the power supply is to be disconnected. The destination to which the power supply off command to be sent is, for example, set in the command.

Base station 5-2, receiving the power supply off command from server 2, recognizes the destination set in the command. When base station 5-1 receives the power supply off command from the other base station 5-2, the power supply off command is supplied to MPU 22 via radio LAN control portion 21 in the base station 5-1. MPU 22 recognizes the power supply off command and gives a power supply disconnection instruction to power supply control portion 25 (in step S2-2).

When the power supply disconnection instruction is supplied to power supply control portion 25 from MPU 22 in step S2-2, power supply control portion 25 controls power supply handling portion 24. In accordance with an instruction from power supply control portion 25, power supply handling portion 24 disconnects power supply to the internal circuits. Thus, the power supply in base station 5-1 is disconnected.

When an ordinary command other than the power supply off command is supplied to MPU 22 in a step S2-1, the MPU controls radio LAN control portion 21 so that ordinary communication processing in the base station is performed (in step S2-3).

Therefore, the power supply in the disconnected base station 5-1 is disconnected through the power supply off command transmitted from the adjacent base station 5-2, and the communication between the radio terminal apparatuses 3-1 through 3-N and the base station 5-1 is stopped.

The radio terminal apparatuses 3-1 through 3-N repeatedly attempt communication to base station 5-1 when a communication error occurs. When communication cannot be performed as a result of the repeat attempts, the radio terminal apparatuses perform communication with the base station 5-2 located in the communication area adjacent to that of the disconnected base station 5-1.

In radio terminal apparatus 3-1, information is stored regarding candidates of the base stations with which communication will be performed when the communication with base station 5-1 cannot be performed. Because base stations 5-1 and 5-2 have a common communication possible area, the base station 5-2 also can perform communication with the radio terminal apparatus 3-1 which has performed the communication with base station 5-1.

Figure 7:
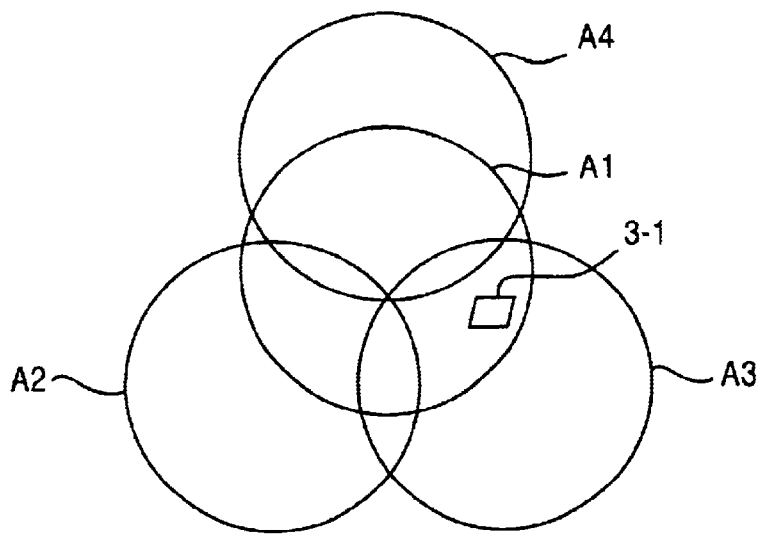
FIG. 7 shows a model diagram of communication possible areas of the base stations in the embodiment of the present invention.

FIG. 7 shows a model diagram of the communication possible areas of the base stations in the embodiment of the present invention.

In FIG. 7, A1 indicates the communication possible area of base station 5-1, A2 indicates the communication possible area of base station 5-2, A3 indicates the communication possible area of base station 5-3 and A4 indicates the communication possible area of base station 54.

For example, the link of base station 5-1 with server 2 is disconnected, and the power supply in base station 5-1 is disconnected. At this time, radio terminal apparatus 3-1 cannot perform communication with the base station 5-1. However, when radio terminal apparatus 3-1 exists in communication possible area A3, the radio terminal apparatus 3-1 performs communication with base station 5-3 which forms communication possible area A3. Therefore, communication errors in radio terminal apparatus 3-1 is avoided.

Therefore, when base station 5-1 has a link NG with the server 2, it can be determined that the base station which does not respond to the command has a malfunction in the LAN circuits as a result of the response confirmation command being transmitted from the server 2 to the respective base stations 5-1 through 5-M. Direct communication from server 2 to base station 5-1 cannot be performed because the link with the server has a malfunction, Therefore, server 2 requests base station 5-2, adjacent to the malfunctioning base station 5-1, to transmit the power supply off command to the base station 5-1.

Because base station 5-2 is normally linked with server 2, base station 5-2 transmits the power supply off command to base station 5-1 in accordance with the request from the server 2. Base station 5-1 has the power supply disconnected as a result of receiving the power supply off command, and transmission and reception with radio terminal apparatuses 3-1 through 3-N becomes impossible. At this time, radio terminal apparatus 3-1 stops attempting communication to base station 5-1; communication with adjacent base station 5-2 begins, and communication errors are avoided.

The conditions of the links between server 2 and base stations 5-1 through 5-M can be easily recognized from link condition management table 18. As a result, restoration of the disconnected link can be quickly performed. Further, because link condition management table 18 is updated every fixed time period and the link condition management table 18 always has the latest information, the conditions of the links between the server 2 and the base stations 5-1 through 5-M can be quickly and efficiently identified.

As a LAN link determination method, the conditions of the links between the server 2 and the base stations 5-1 through 5-M are determined as a result of transmission of the command from the server 2 to the respective base stations 5-1 through 5-M. However, the method is not limited to this configuration. For example, a method could be used in which the conditions of the LAN links are confirmed as a result of each base station monitoring the adjacent base stations.

Furthermore, although PING and TCP/IP are cited as examples of the response confirmation command for confirming the links and for power supply commands, other command protocols can be used.

As described above, the embodiments of the present invention provides numerous advantages with respect to preventions of troublesome communications, and also providing higher performance and increased reliability.

As noted previously, the above description of the preferred embodiments of the invention are provided as examples only. Numerous modifications and changes can be made to the apparatus and methods disclosed above, and still remain within the spirit and scope of the invention. A determination of the metes and bounds of the present invention can be provided by referring to the appended claims.

What is claimed is:

1. A method for controlling radio communication in a system wherein a server is connected to a plurality of base stations, and wherein the base stations communicate to the plurality of terminals via wireless radio communication, said method comprising the steps of:

detecting a condition of a link between a server and a first base station of said plurality of base stations; and stopping communication between the first base station and a first terminal when it is determined in the detecting step that a disconnection exists between the first base station and the server.

2. A method for controlling radio communication in a system wherein a server is connected to a plurality of base stations, and wherein the base stations communicate to the plurality of terminals via wireless radio communication, said method comprising the steps of:

detecting a condition of a link between a server and a first base station of said plurality of base stations; and stopping communication between the first base station and a first terminal when it is determined in the detecting step that a disconnection exists between the first base station and the server, wherein said stopping step comprises a step of transmitting a power supply off command from a second base station to the first base station.

3. A method for controlling radio communication in a system wherein a server is connected to a plurality of base stations, and wherein the base stations communicate to the plurality of terminals via wireless radio communication, said method comprising the steps of:

detecting a condition of a link between a server and a first base station of said plurality of base stations;

stopping communication between the first base station and a first terminal when it is determined in the detecting step that a disconnection exists between the first base station and the server; and switching communication with the first terminal to said second base station from said first base station upon detection of the disconnection between the first base station and the server.

4. The method according to claim 1, comprising a step of repeating the detecting of the condition of the link between the server and the first base station, after a lapse of a predetermined time period.

5. A radio communication system including a server for providing data to terminals through a plurality of base stations, said system comprising:

a link detecting device for detecting a condition of a link between a server and a first base station of the plurality of base stations; and a first communication stopping device for stopping communication between the first base station and a first terminal of the plurality of terminals upon a detection by said link detecting device of a disconnection between the first base station and the server.

6. A radio communication system including a server for providing data to terminals through a plurality of base stations, said system comprising:

a link detecting device for detecting a condition of a link between a server and a first base station of the plurality of base stations; and a first communication stopping device for stopping communication between the first base station and a first terminal of the plurality of terminals upon a detection by said link detecting device of a disconnection between the first base station and the server, wherein said first communication stopping device provides a signal to a second base station, said second base station stopping the communication between the first base station and the first terminal.

7. The radio communication system as recited in claim 5, further comprising a link condition management table for storing and managing conditions of the links between the server and each of the plurality of base stations.

8. A radio communication system including a server for providing data to terminals through a plurality of base stations, said system comprising:

a link detecting device for detecting a condition of a link between a server and a first base station of the plurality of base stations; and a first communication stopping device for stopping communication between the first base station and a first terminal of the plurality of terminals upon a detection by said link detecting device of a disconnection between the first base station and the server, wherein said first communication stopping device comprises disconnecting means for disconnecting a power supply of said first base station upon a detection of a disconnection of the first base station and the server.

9. A radio communication system, comprising:

a server containing transmittable data therein;

at least a first base station connected to said server, said first base station for wirelessly transmitting data from said server;

at least a first terminal, said first terminal configured to receive data transmitted from the first base station; said system further comprising a link detecting device for detecting a condition of a connection between said server and said first base station; and a first communication stopping device disposed in said server, said first communication stopping device for stopping communication between the first base station and the first terminal upon a detection by said link detecting device of a disconnection between the first base station and the server, said first communication stopping device issuing a signal to a second base station to stop the communication between the first base station and the first terminal.

10. The radio communication system as recited in claim 5, wherein said link detecting device repeatedly detects the condition of a link between a server and the first base station.

11. The radio communication system as recited in claim 5, wherein said link detecting device detects conditions of links between the server and each base station of the plurality of base stations.

12. The radio communication system as recited in claim 9, wherein said link detecting device repeatedly detects the condition of a link between a server and the first base station of the plurality of base stations.

13. The radio communication system as recited in claim 9, wherein said link detecting device detects conditions of links between the server and each base station of the plurality of base stations.

14. A system as recited in claim 9, wherein said first communication stopping device provides a signal to a second base station, said second base station stopping the communication between the first base station and the first terminal.

15. The radio communication system as recited in claim 9, further comprising a link condition management table for storing and managing conditions of the links between the server and each of the plurality of base stations.

16. The radio communication system as recited in claim 9, wherein said first communication stopping device comprises a disconnecting device for disconnecting a power supply of said first base station upon a detection of a disconnection of the first base station and the server.

17. A method for controlling radio communication in a system wherein a server is connected to a plurality of base stations, and wherein the base stations communicate to the plurality of terminals via wireless radio communication, said method comprising the steps of:

detecting a condition of a link between a server and a first base station of said plurality of base stations;

stopping communication between the first base station and a first terminal when it is determined in the detecting step that a disconnection exists between the first base station and the server; and switching communication with the first terminal to said second base station from said first base station upon detection of the disconnection between the first base station and the server, wherein said step of switching communication to said second base station includes communicating with a second terminal from said second base station.

18. An information processing device for processing information in conjunction with a plurality of radio communication stations, said information processing device comprising:

a connection condition detecting device for detecting conditions of connections between the information processing device and each of the plurality of radio communication stations; and a command sending device for sending a stopping command to stop operations of a first radio communication station to a second radio communication station upon a detection by said connection condition detecting device of a communications fault in said first radio communication station.

19. An information processing device for enabling communication from a first apparatus to a plurality of second apparatuses in accordance with commands from said first apparatus, said information processing device communicating with said plurality of second apparatuses via wireless radio communications, said information processing device comprising:

a command generating means for generating a command for instructing the disconnection of a power supply wherein the command is generated upon a detection of a link disconnection between the first apparatus and at least one of the plurality of second apparatuses;

a command receiving device for receiving the command from said first apparatus, said command instructing the disconnection of the power supply;

a power supply disconnection recognizing device for recognizing, from said command, a selected one of the plurality of second apparatuses to have the power supply be disconnected; and a command transmitting device for transmitting the command to the selected one of the plurality of second apparatuses having the power supply to be disconnected, wherein the disconnection of the power supply causes the communication between the first apparatus and the selected one of the plurality of second apparatuses to terminate.

20. A method for controlling radio communication, the method comprising:

determining if a malfunction exists in communication between a first one of a plurality of base stations and a server, the first one of the plurality of base stations being in wireless communication with at least one terminal; and if the malfunction exists in communication between the first one of the plurality of base stations and the server, terminating communication between the first one of the plurality of base stations and the server.

21. A method for controlling radio communication, the method comprising:

determining if a malfunction exists in communication between a first one of a plurality of base stations and a server, the first one of the plurality of base stations being in wireless communication with at least one terminal; and if the malfunction exists in communication between the first one of the plurality of base stations and the server, terminating communication between the first one of the plurality of base stations and the server and performing communication with each of the at least one terminal via a second one of the plurality of base stations.

* * * * *